US008972576B2

(12) United States Patent
Anderson (10) Patent No.: US 8,972,576 B2
(45) Date of Patent: *Mar. 3, 2015

(54) ESTABLISHING A HOME RELATIONSHIP BETWEEN A WIRELESS DEVICE AND A SERVER IN A WIRELESS NETWORK

(75) Inventor: Eric C. Anderson, Gardnerville, NV (US)

(73) Assignee: KDL Scan Designs LLC, Dover, DE (US)

( * ) Notice: Subject to any disclaimer, the term of this patent is extended or adjusted under 35 U.S.C. 154(b) by 3277 days.

This patent is subject to a terminal disclaimer.

(21) Appl. No.: 10/833,381

(22) Filed: Apr. 28, 2004

(65) Prior Publication Data

US 2005/0245233 A1  Nov. 3, 2005

(51) Int. Cl.
| | |
|---|---|
| *G06F 15/173* | (2006.01) |
| *H04L 29/06* | (2006.01) |
| *H04W 12/06* | (2009.01) |
| *H04L 29/08* | (2006.01) |
| *H04W 8/00* | (2009.01) |

(52) U.S. Cl.
CPC ............. *H04L 63/08* (2013.01); *H04W 12/06* (2013.01); *H04L 67/36* (2013.01); *H04W 8/005* (2013.01)
USPC ....................................................... 709/225

(58) Field of Classification Search
CPC ..... H04L 29/06; H04L 41/0806; H04L 63/08; H04L 63/0823; H04L 63/083; H04L 63/10; H04W 12/04; H04W 12/06; H04W 12/08; H04W 28/18; H04W 48/16; H04W 76/02; H04W 8/005; H04W 84/12; H04W 88/08
USPC ....................................................... 709/225
See application file for complete search history.

(56) References Cited

U.S. PATENT DOCUMENTS 5,966,705 A * 10/1999 Koneru et al. .................... 707/9
6,091,956 A    7/2000 Hollenberg
(Continued)

FOREIGN PATENT DOCUMENTS

| EP | 1058450 | 12/2000 |
|---|---|---|
| WO | WO02057869 | 8/2002 |

(Continued)

OTHER PUBLICATIONS

United States Patent and Trademark Office ISA/US; PCT/US05/19363 International Search Report, International Preliminary Report on Patentability, Written Opinion; Oct. 24, 2006; 13 Pages.

(Continued)

*Primary Examiner* — Christopher Biagini
(74) *Attorney, Agent, or Firm* — Stolowitz Ford Cowger LLP (57) ABSTRACT

A method and system for establishing a persistent relationship between a mobile device and a server in a network is provided. Aspects of the invention include detecting the presence of the mobile device, and in response to determining that the device is unrecognized, automatically notifying a network administrator. In response to receiving the administrator's authorization to establish a relationship, a user of the mobile device is requested to authorize the establishment of the relationship. If the user then accepts the offer and authorizes the relationship, the relationship is automatically established between the device and the network, such that no additional configuration is required by the user of the device to communicate over the network once the relationship has been established.

49 Claims, 3 Drawing Sheets

(56) References Cited

U.S. PATENT DOCUMENTS

| | | | |
|---|---|---|---|
| 6,119,001 A * | 9/2000 | Delis et al. | 455/433 |
| 6,332,579 B1 | 12/2001 | Ritter | |
| 6,449,473 B1 | 9/2002 | Raivisto | |
| 6,502,192 B1 * | 12/2002 | Nguyen | 726/4 |
| 6,542,740 B1 | 4/2003 | Olgaard | |
| 6,639,975 B1 | 10/2003 | Oneal et al. | |
| 6,670,982 B2 | 12/2003 | Clough | |
| 6,816,722 B2 | 11/2004 | Blom et al. | |
| 6,930,709 B1 | 8/2005 | Creamer et al. | |
| 6,937,850 B2 | 8/2005 | Lippelt | |
| 6,950,628 B1 * | 9/2005 | Meier et al. | 455/41.2 |
| 6,967,675 B1 | 11/2005 | Ito et al. | |
| 7,054,618 B1 | 5/2006 | McCullough | |
| 7,085,360 B1 | 8/2006 | Sprouse | |
| 7,106,176 B2 | 9/2006 | La | |
| 7,266,383 B2 | 9/2007 | Anderson | |
| 7,280,830 B2 | 10/2007 | Anderson | |
| 7,289,631 B2 * | 10/2007 | Ishidoshiro | 380/270 |
| 2001/0003191 A1 | 6/2001 | Kovacs et al. | |
| 2001/0054101 A1 * | 12/2001 | Wilson | 709/225 |
| 2002/0022474 A1 | 2/2002 | Blom et al. | |
| 2002/0114469 A1 * | 8/2002 | Faccin et al. | 380/270 |
| 2002/0137544 A1 | 9/2002 | Myojo | |
| 2003/0025796 A1 | 2/2003 | Yamagishi | |
| 2003/0030839 A1 | 2/2003 | Walters et al. | |
| 2003/0054810 A1 * | 3/2003 | Chen et al. | 455/422 |
| 2003/0054833 A1 | 3/2003 | Hayduk | |
| 2003/0058343 A1 | 3/2003 | Katayama | |
| 2003/0065824 A1 | 4/2003 | Kudo | |
| 2003/0078959 A1 | 4/2003 | Yeung et al. | |
| 2003/0157960 A1 | 8/2003 | Kennedy | |
| 2003/0200297 A1 | 10/2003 | Wiener | |
| 2003/0204445 A1 | 10/2003 | Vishik et al. | |
| 2003/0207685 A1 | 11/2003 | Rankin | |
| 2003/0220765 A1 * | 11/2003 | Overy et al. | 702/158 |
| 2003/0225701 A1 | 12/2003 | Lee et al. | |
| 2003/0227554 A1 | 12/2003 | Kazami et al. | |
| 2003/0232598 A1 * | 12/2003 | Aljadeff et al. | 455/41.2 |
| 2004/0003285 A1 * | 1/2004 | Whelan et al. | 713/201 |
| 2004/0032498 A1 | 2/2004 | Wyn-Harris | |
| 2004/0039813 A1 | 2/2004 | Clark et al. | |
| 2004/0046868 A1 * | 3/2004 | Anderson et al. | 348/207.11 |
| 2004/0082326 A1 | 4/2004 | Shaw et al. | |
| 2004/0098515 A1 | 5/2004 | Rezvani et al. | |
| 2004/0132449 A1 | 7/2004 | Kowarsch | |
| 2004/0151311 A1 | 8/2004 | Hamberg | |
| 2004/0185826 A1 | 9/2004 | Koskinen et al. | |
| 2004/0192268 A1 | 9/2004 | Pyhalammi | |
| 2004/0201702 A1 | 10/2004 | White | |
| 2004/0203848 A1 | 10/2004 | Kumar | |
| 2004/0225614 A1 | 11/2004 | Arnold et al. | |
| 2004/0248547 A1 | 12/2004 | Philsgard | |
| 2004/0249922 A1 | 12/2004 | Hakeman et al. | |
| 2005/0021724 A1 | 1/2005 | Kung et al. | |
| 2005/0027608 A1 | 2/2005 | Wiesmuller et al. | |
| 2005/0033850 A1 * | 2/2005 | Kirkland | 709/228 |
| 2005/0063355 A1 | 3/2005 | Iwamura | |
| 2005/0146621 A1 | 7/2005 | Tanaka et al. | |
| 2005/0241004 A1 | 10/2005 | Pyhalammi | |
| 2005/0257055 A1 | 11/2005 | Anderson | |
| 2005/0277412 A1 | 12/2005 | Anderson | |
| 2006/0013197 A1 | 1/2006 | Anderson | |
| 2006/0014520 A1 | 1/2006 | Anderson | |

FOREIGN PATENT DOCUMENTS

| | | |
|---|---|---|
| WO | WO03024094 | 3/2003 |
| WO | WO2006015298 | 7/2005 |
| WO | WO2005104758 | 11/2005 |
| WO | WO2005119522 | 12/2005 |

OTHER PUBLICATIONS

United States Patent and Trademark Office ISA/US; PCT/US05/27181 International Search Report, International Preliminary Report on Patentability, Written Opinion; Mar. 6, 2006; 11 Pages.

United States Patent and Trademark Office ISA/US; PCT/US2005/104464 International Search Report, International Preliminary Report on Patentability, Written Opinion; Nov. 1, 2007; 11 Pages.

Stolowitz Ford Cowger LLP; Related Case Listing; Aug. 17, 2012, 2 Pages.

* cited by examiner

ESTABLISHING A HOME RELATIONSHIP BETWEEN A WIRELESS DEVICE AND A SERVER IN A WIRELESS NETWORK

FIELD OF THE INVENTION

The present invention relates to computer networks, and more particularly to a method and system for establishing a home relationship between a wireless device and a server in a wireless network.

BACKGROUND OF THE INVENTION

A wireless LAN is a local area network that transmits over the air and does not require a line site between a sending and receiving device. Typically, one or more wireless base stations, which are also referred to as access points, are wired to an Ethernet network, while wireless adapters are either built into or attached to client devices. The access points and the wireless devices communicate via radio frequency over an area of several hundred feet through walls and other barriers. If there are multiple access points as in a corporation, for example, then roaming devices can be handed-off from one access point to another. One example of a wireless LAN standard today is 802.11.

For short distances between two devices, a wireless personal area network (PAN) may be used, such as Bluetooth. Bluetooth is an open standard for short-orange transmission of digital voice and data between local devices, such as laptops, PDAs, imaging devices, phones, and desktop devices. Bluetooth supports point-to-point and multiple applications, and has a range of 10 meters up to 100 meters with a power boost. Infrared transmission (IrDA) may also be used for very short distances between two devices, however, IrDA requires line site between the two devices, while Bluetooth uses on the directional radio waves that can transmit through walls and other barriers.

One application for a wireless LAN is in the home for connecting two or more computers/devices. A home LAN is often the same Ethernet network found in companies, except that the home network is configured as one network, whereas a company may have many subnetworks for traffic and security purposes.

Not only is the number of wireless mobile devices being introduced to the market steadily increasing, but the types of devices equipped with wireless technology is also growing. For example, Bluetooth-enabled camcorders are now available. The problem is that the wireless devices are designed to work with a limited number of related products. Device manufacturers and network standard committees have yet to offer a "big picture" approach that deals with how wireless devices interact with networks in a rich environment in which a user may encounter multiple wireless networks in any given day simply by walking around with his or her wireless device. That is, each time a user's wireless device detects the presence of a wireless network, a user must perform manual configuration to enable the device to communicate with a network, even if the user encounters the same network day after day, such as with a network they have set up at their home. In some cases, access can be automatically established with a single network via password and ID or some security key, which was manually entered into the device to establish access the first time. However, when a different network is encountered, manual intervention is typically required to establish connection.

Although networks such as Bluetooth's piconet enable a set of devices owned by one person to communicate, and also allow for selected, user-enabled interactions with a wireless device owned by another person nearby, Bluetooth's protocol fails to provide an agreed-upon mechanism for broader and persistent interactions between a Bluetooth-enabled device and other wireless networks that the device encounters.

Accordingly, what is needed is an improved network protocol that enables the establishment of a known, persistent relationship between a mobile wireless device and a wireless network, such that no additional configuration is required by the user for the device to communicate over the network once the relationship has been established. The present invention addresses such a need.

SUMMARY OF THE INVENTION

The present invention provides a method and system for establishing a persistent relationship between a mobile device and a server in a network. Aspects of the invention include detecting the presence of the mobile device, and in response to determining that the device is unrecognized, automatically notifying a network administrator. In response to receiving the administrator's authorization to establish the relationship, a user of the mobile device is notified and requested to authorize the establishment of the relationship. If the user then accepts the offer and authorizes the relationship, the relationship is automatically established between the device and the network.

According to the method and system disclosed herein, a "home" relationship is established between the device and the network, whereby the device recognizes the network as its home network, and the network recognizes the device as an "owned" device that is an extension of the network. Using the relationship, the device is granted automatic access to the network whenever it comes within active range of the network. Thus, the present invention provides a persistent relationship between the device and the network, such that no additional configuration is required by the user of the device to communicate over the network once the relationship has been established.

DETAILED DESCRIPTION OF THE INVENTION

The present invention relates to establishing a persistent known relationship between a wireless mobile device and a network. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a network protocol that enables the establishment of a known relationship between a wireless device and a network server in a wireless network, such that no additional configuration is required by the user for the device to communicate over the network once the relationship has been established. In addition, no password, ID, or security key is required to be entered into the device to establish the connection.

Figure 1:
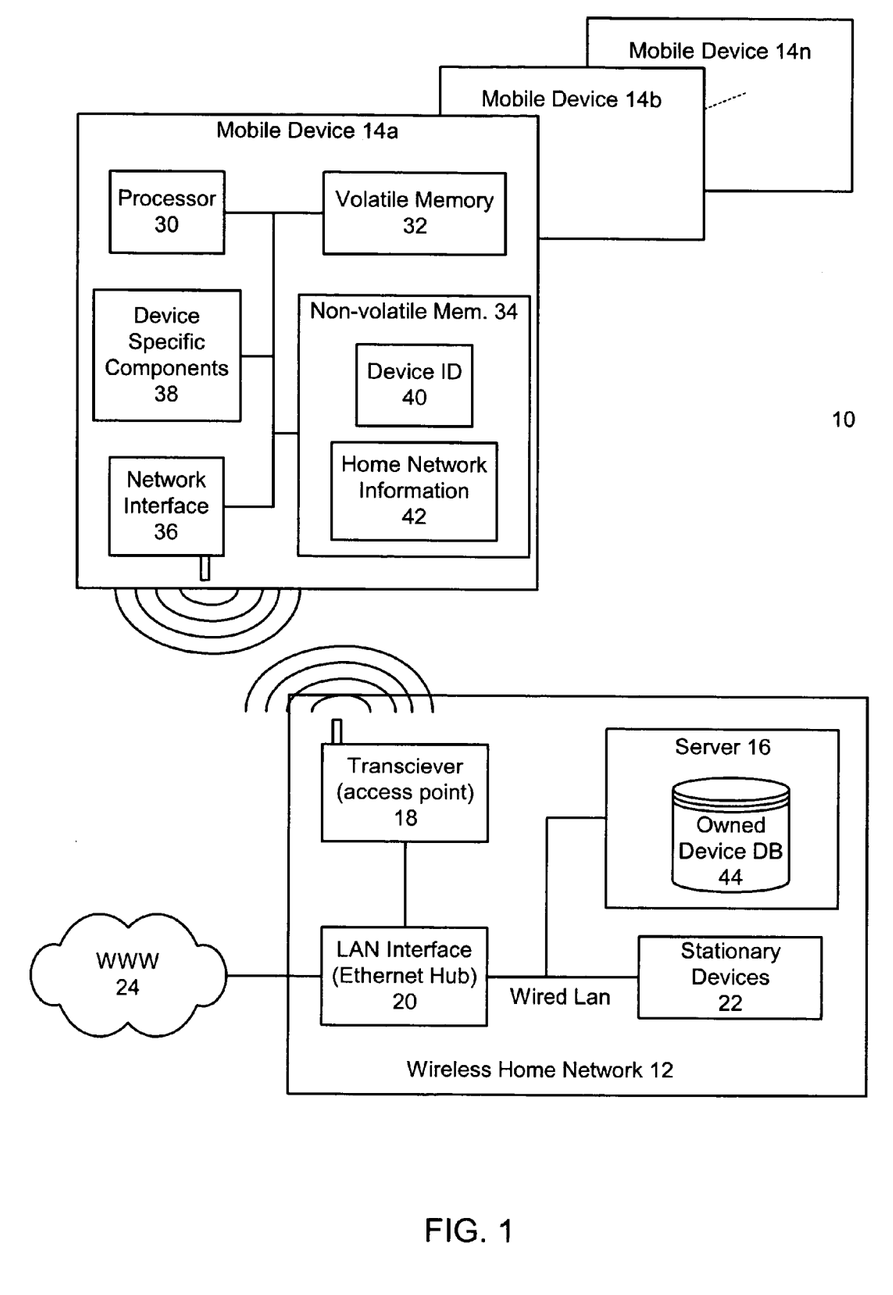
FIG. 1 is a block diagram illustrating a network configuration for use in accordance with the preferred embodiments of the present invention.

FIG. 1 is a block diagram illustrating a network configuration for use in accordance with the preferred embodiments of the present invention. In a preferred embodiment, the network configuration 10 comprises a wireless home network 12 capable of wireless communication with wireless mobile devices 14a-14n (collectively, mobile devices 14). The home network 12 includes one or more base stations, typically a server 16, coupled to one or more access points (transceivers) 18 through a LAN interface (e.g., Ethernet hub) 20. Other stationary devices 22 may also be coupled to the LAN interface 20 over a wired LAN, such as a printer, fax machine, music jukebox, and the like. The LAN interface 20 provides all the devices within the home network access to the Internet 24. Each mobile device 14 includes a CPU or DSP 30, volatile and non-volatile memory 32 and 34, a network interface 36 that enables wireless communication, and device specific components 38 for carrying out the intended function of the device 14.

The present invention eliminates the need for passwords, ID's, or security keys to be entered into the mobile device to establish a connection, and alleviates the need for users to continually perform manual steps to enable communication between the mobile devices 14 and the home network 12 each time one of the mobile devices 14 comes within communication range of the network 12. According to the present invention, the network server 16 establishes a special relationship with a new device 14, if desired both by the local network administrator and the new device owner. The relationship established between the network 12 and the wireless device 14 is the identification of the network 12 or network server 16 as "home" from the point of view of the wireless device 14; and is the identification of an "owned device" from the point of view of the network server 16. That is, owned by the server 16 as an extension component of itself, in the same way that Microsoft Windows™ recognizes attached plug & play devices.

This special "home" relationship must be established with authorization from both the device owner and the network administrator or owner. It would be undesirable to automatically establish such a relationship via underlying wireless protocols because a person's device could be commandeered by any network that the user happens to pass by. However, according to the present invention, the network server 16 distinguishes between a new device 14a—one not "owned" by the network 12, and an owned device 14b—one in which ownership has already been established. The focus of the present invention is not on establishing actual ownership of the device 14a, but on establishing automatic access of the device 14a to the network 12 after a persistent relationship has been established.

In operation, once the server 16 detects the presence of a device 14a on the network 12, it is assumed to be a visitor, unless it is recognized through a pre-established relationship. One of the ways of dealing with an unrecognized, and unowned, device 14a is to automatically notify the network administrator/owner, and request that they select from a list what kind of relationship is desired between the device and the network 12. One specific relationship is the "home" relationship, which accepts the device 14b as an extension of the network 12, with full or specified access. Some relationships can be automatic, but typically the less restricted the access granted, the more likely owner intervention is required at some point in time.

If the network owner selects the new device relationship as a "home" relationship, this decision must also be accepted by the user of the device 14a, which is presumed to be the owner. Preferably, this notification occurs via some form of interaction with the device 14a itself. Therefore, once the network administrator defines the relationship he or she is willing to grant the device 14a, the device owner is notified and requested to authorize establishment of the relationship. In the case where both network 12 and device owners are one in the same (e.g., a user buys a camera phone to function with the home network) the transaction proceeds. In the case that the two owners are different, both must agree before the transaction proceeds. This prevents a network operator from "snagging" a home relationship with a device that happen to enter their network area, without the permission of the owner of the device 14a.

If the device owner accepts the relationship, the specified relationship is established, and the device 14 is connected to the network 12. Thereafter, when the presence of the device 14 is subsequently detected by the network 12, the device 14 will be automatically recognized by the network 12 and allowed access with no additional configuration required by the user for operation. In addition, the device recognizes the network as home, thus preventing a foreign network from accessing data within the device that would typically be allowed from the home network.

This network configuration 10 could be implemented in a home (home network), a corporation, a retail store, or in some other type of business (corporate or government network). The present invention will be described in terms of a preferred embodiment of a home network, but the features apply equally to business and/or government networks. In the case of a home network 12, the network administrator is typically the owner of the network, and if the same person purchased the new wireless device 14a, then the network administrator and the device users is one in the same.

Figure 2A:
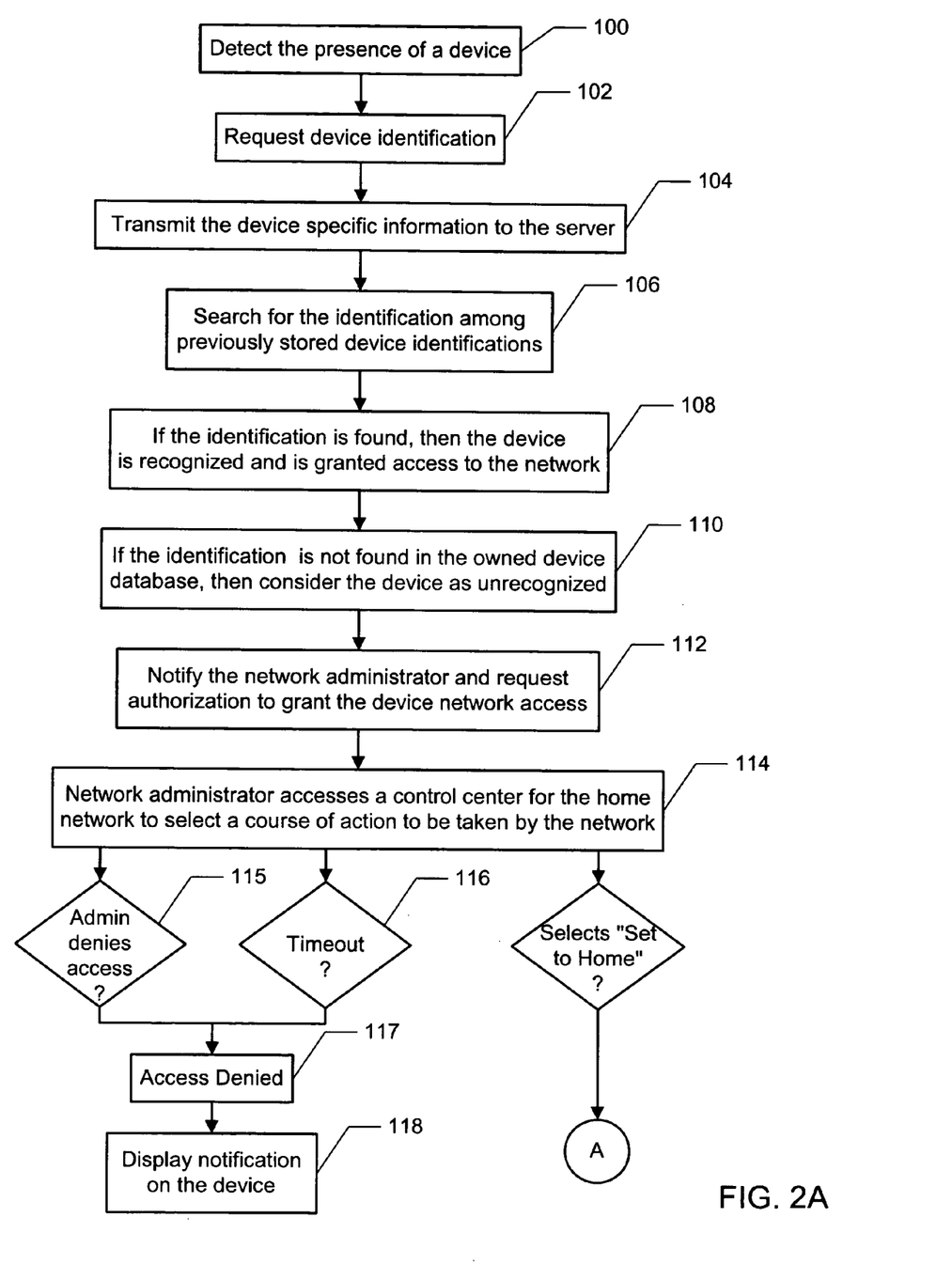
FIGS. 2A and 2B are flow diagrams illustrating the process for establishing a persistent relationship between a mobile device and a server in a wireless network in accordance with a preferred embodiment of the present invention.
Figure 2B:
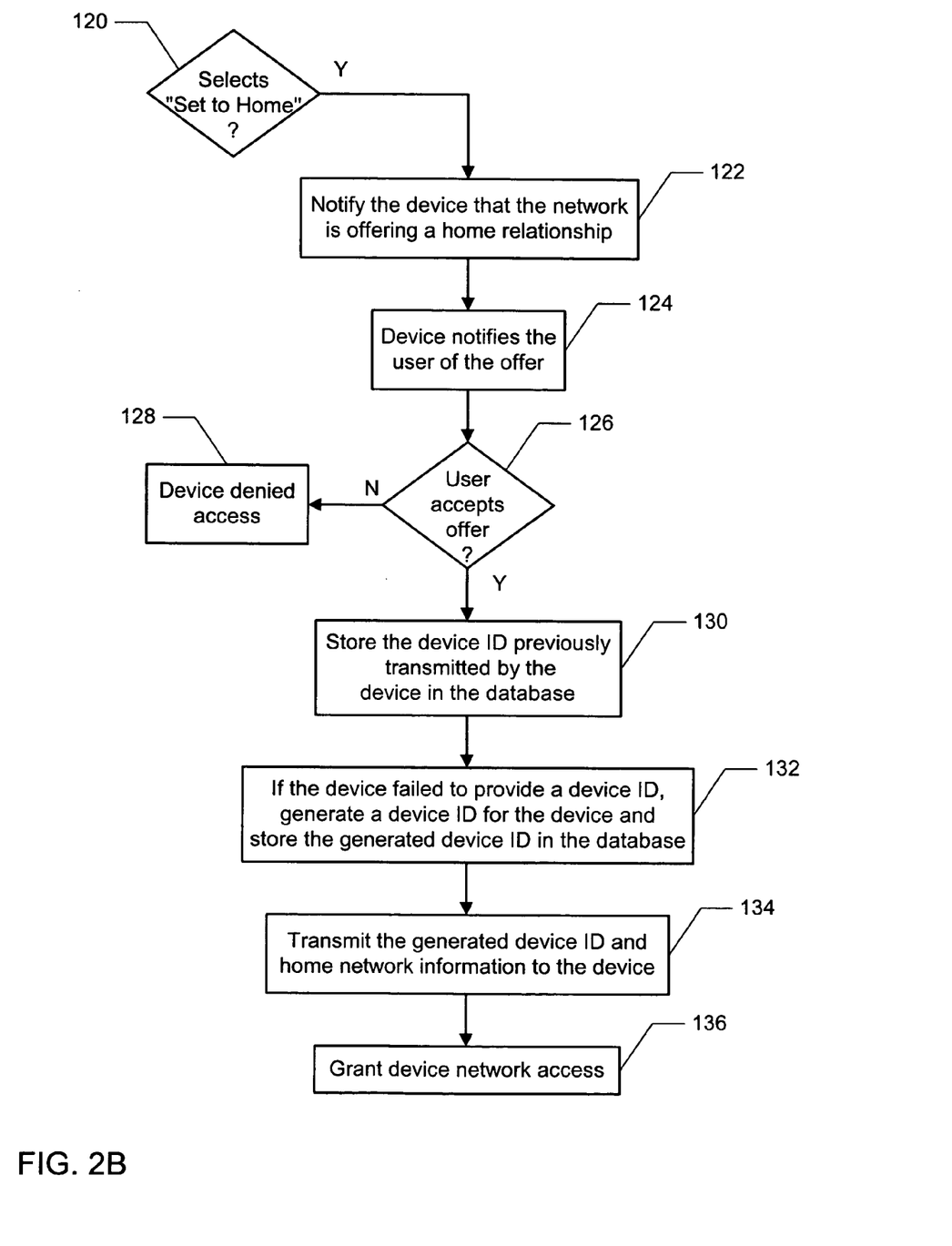

FIGS. 2A and 2B are flow diagrams illustrating the process for establishing a persistent relationship between a mobile device 14 and a server 16 in a wireless network 12 in accordance with a preferred embodiment of the present invention. The process begins when the server 16 detects the presence of a device 14 within the active area of the local network 12 (step 100). In a preferred embodiment, the server 16 discovers the device 14 when a standard wireless network protocol discovery process establishes a restricted connection.

Once the server 16 detects the presence of the device 14, the server 16 attempts to recognize the device 14 by requesting device identification 40 from the device 14 (step 102). In a preferred embodiment, the device identification 40 is information by which the server 16 can uniquely identify the device 14, such as a device ID, or serial number, for example. Referring again to FIG. 1, the device identification 40 is preferably stored internally in the device 14 in non-removable non-volatile memory 34.

Referring again to FIG. 2A, in response to receiving the request, the device 14 transmits the device specific information (if available) to the server 16 (step 104). Once the server 16 receives the device identification 40, the server 16 searches for the identification 40 among previously stored device identifications (step 106). In a preferred embodiment, the stored device identifications are kept in an "owned device" database 44, although a simple table or list could also be used. If the identification 40 is found, then the device 14 is recognized by the server 16 (step 108), and is granted access to the network 12 commiserate with stored preferences.

If the identification 40 is either not received or is not found in the owned device database 44, then the device 14a is unrecognized by the server 16 (step 110). The server 16 then notifies the network administrator using a method specified set in network preferences and requests authorization from the network administrator/owner to grant the device 14*a* access to the network 12 (step 112).

The owner can be notified by the home network 12 via one or more of the devices 22 attached to the network 12, such as an HDTV system, a high fidelity sound system, PC's located at various places inside the home or office, a pager or cell phone, or by special devices attached to the network 12 for this exclusive purpose. The notification may be through any audible or visual signal, such as a bell, and audio file being played over a sound system, a blinking light, or some other form of attention-getting signal. An electronic notification may be sent to a mobile device owned by the administrator, such as placing a call to the owner cell phone (text message or synthetic/recorded voice), or sending a message to the owner's pager, PDA, or messaging device. Of course, any combination of the above may also be used.

The network administrator/owner, recognizing the signal, would then access a control center for the home network 12 to select a course of action to be taken by the network 12 in regard to the device 14*a* (step 114). In a preferred embodiment, the control center automatically displays a list of different courses of actions. Alternatively, the owner could activate such a menu by interacting with the user interface of the control center. Note that the control center can also be a mobile device, such as a cell phone or wireless PDA carried by the owner. This allows the network owner to operate from his current location.

The actions displayed to the user may include: defining a known relationship between the device 14*a* and the network 12 that continues until revoked; denying access; allowing limited access; and allowing full access. In a preferred embodiment, the known relationship, which is persistent until revoked, is the "home" relationship. Other relationships are also possible, such as a persistent or temporary "guest" relationship. The owner would then select the desired relationship between the network and the new device.

If the administrator denies access (step 115) or fails to intervene with a preset time (step 116), the unrecognized device 14*a* is denied access to the network 12 (step 117). Devices that are not currently recognized would display a corresponding notification to their users (step 118), or would operate as if no network existed.

Alternative embodiments include the following: if there is no network owner intervention, an unrecognized device may be allowed guest access, depending on preset owner preferences. Temporary guest access can be set, according to preferences set by the owner, to allow some limited use of the local network by the guest, such as connection to the world wide web. This connection can be restricted in a number of ways, such as time, bandwidth, or transfer limits. Guest access of this type would allow roving devices to be more useful to their owners, in that limited connection to the world wide web whenever they were within the area of a local wireless network would be automatically provided.

One of the possible selections offered to the network administrator would be to set up a persistent guest access for the device. In this case, the device would be registered as a guest device in database 44. This would eliminate future notifications when this guest was detected. In this case, no interaction is required between the device and its owner.

In a typical network environment such as a home, the notification process described above for the network administrator would be appropriate. However, in high traffic locations, such as a business, a retail store, or an apartment on a busy street, the constant notifications of momentary connections with passer-bys would be troublesome. In this case, notification can be suppressed—i.e., no audible or visual indication given. However, the process would still be available to establish a home relationship. In this case, the owner would simply access the network control center, select the appropriate menu, and (if more than one guest device was active) select the appropriate device with which to establish a home connection. The device notification and interaction described below would be the same.

Referring now to FIG. 2B, assuming that the new device 14*a* is a recent purchase, then the owner will select the menu option that sets the network as "home" for the device (step 120). The server 16 notifies the device 14*a* that the network 12 is offering a home relationship to the device 14*a* (step 122). In response to receiving the notification from the server 16 of an offered relationship, the device 14*a* notifies the device user to authorize the relationship (step 124). The device user may either accept or reject the offer (step 126). The home relationship, if accepted, not only allows access to the network by the device, but, as we shall describe below, access to the device by the network. Thus, accepting home relationship means allowing access to the device, which requires user permission. If the device user rejects the offer, the device 14*a* is denied access to the network 12 and the process ends (step 128). Alternatively, guest access is provided in this case, depending on preferences set by the network administrator.

If the device owner accepts the offer, then the server 16 begins the establishment of the relationship by storing the device ID 44 that was previously transmitted by the device 14 in the owned device database 44 (step 130) for future automatic recognition of the device 14 and network access grant. If the device 14 failed to provide a device ID 44, then the network 12 generates a device ID 40 for the device 14 and stores the generated device ID 40 in the database 44 (step 132). The server 16 also transmits the generated device ID 40 and home network information 42 to the device 14 for storage to facilitate device recognition of the home network (step 134). The device is then granted network access as a home device, based on preference settings and device types (step 136).

According to present invention, this "home" relationship allows automatic functions to occur, such as data sharing. In the case of a digital camera, for example, this could mean the automatic downloading of new images discovered on the storage device in the camera whenever the camera shows up on the network.

The purpose of the stored network information within the device is to allow the device to also recognize its home network. This is important from a security point of view, because the home relationship may include not only access to the network, but network access to the device. For example, if the device is a cell phone, and a new phone number has been received by the network from a friend, this information can automatically update the phone list in the cell phone. Or, if the device is a digital camera, the network may interrogate the camera for new images, and, if found, automatically download them, and even deleting them in the camera, based on preference settings. This would free up camera memory to take additional pictures without the user having to specifically download and store the images, and then erase them manually. Therefore, it is critical that the device recognize the home network as well as the home network recognize the device. It would be undesirable to grant any network that claims it is the home network access to the device: some form of certification or validation is required.

When the "home" owned transaction is complete, there is a device record held by the network, and a network record held by the device, to facilitate recognition between the network and the device on subsequent detections. This record can be in many forms, including serial numbers, user names and other information. The only requirement is that the information provides unique identification of the device and network.

An alternate embodiment of this invention employs a wired connection between the device and the network. While wired devices are often set at fixed locations, mobile devices may also be connected via a docking station (wired or wireless), or by simply plugging a cable from the network or a network computer into them. The same form of interaction described for wireless devices applies to these wired cases as well.

A method and system for establishing a home relationship between a wireless device and a server in a wireless network has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

The methods described herein can be embodied in executable instructions stored in a computer-readable medium for use by or in connection with an instruction execution machine, system, apparatus, or device, such as a computer-based or processor-containing machine, system, apparatus, or device. As used here, a "computer-readable medium" can include one or more of any suitable media for storing the executable instructions of a computer program in one or more of an electronic, magnetic, optical, and electromagnetic form, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a random access memory (RAM); a read only memory (ROM); an erasable programmable read only memory (EPROM or Flash memory); optical storage devices, including a portable compact disc (CD), a portable digital video disc (DVD), and the like.

We claim:

1. A method for establishing a relationship between a mobile device and a server in a network, comprising;
   (a) detecting the presence of the mobile device;
   (b) in response to determining that the mobile device is unrecognized, automatically notifying a network administrator;
   (c) in response to receiving authorization from the network administrator to establish the relationship, requesting authorization from the mobile device to authorize the establishment of the relationship; and
   (d) establishing the relationship between the mobile device and the network in response to receiving the authorization from the mobile device, such that no additional configuration is required by the mobile device to communicate over the network once the relationship has been established.

2. The method of claim 1, wherein (d) further comprises defining a home relationship between the mobile device and the network.

3. The method of claim 2, wherein (d) further comprises establishing the home relationship by identifying the network as home in the mobile device, and identifying the mobile device as owned to the server.

4. The method of claim 3, further comprising, upon the establishment of the home relationship, granting the mobile device access to the network and granting the network access to the mobile device.

5. The method of claim 4, wherein (c) further comprises defining a type of relationship the network administrator is willing to grant the mobile device.

6. The method of claim 5, wherein (b) further comprises notifying the network administrator by at least one of an audible or visual signal played on one or more devices coupled to the network, or an electronic notification sent to a mobile device owned by the network administrator.

7. The method of claim 6, wherein (b) further comprises displaying on a control center for the network for selection by the network administrator, a list of actions to be taken by the network in regard to the mobile device.

8. The method of claim 7, wherein the list of actions comprises defining a known relationship between the device and the network that continues until revoked, denying access, allowing limited access, or allowing full access.

9. The method of claim 6, wherein (b) further comprises allowing the network administrator to set a default action that defines the relationship for the device in absence of owner intervention.

10. The method of claim 3, wherein (a) further comprises:
    (i) requesting, by the sever, the device identification from the mobile device;
    (ii) receiving, by the server, the device identification;
    (iii) searching for the device identification among stored device identifications; and
    (iv) based at least on finding the device identification, granting the mobile device access to the network.

11. The method of claim 10, wherein (d) further comprises storing, by the server, the device identification previously transmitted by the mobile device.

12. The method of claim 11, wherein (d) further comprises:
    (i) storing, by the server, the device identification in response to the device identification being unavailable; and
    (ii) transmitting from the server to the mobile device network information to facilitate device recognition of the home network.

13. The method of claim 11, wherein (d) further comprises:
    (i) generating a generated device identification for the device in response to the device identification being unavailable;
    (ii) storing, by the server, the generated device identification; and
    (iii) transmitting from the server to the device the generated device identification and network information to facilitate device recognition of the home network.

14. The method of claim 1, wherein (d) further comprises defining a guest relationship between the mobile device and the network.

15. The method of claim 14, wherein (d) further comprises defining a temporary guest access that allows limited use of the network by the mobile device.

16. The method of claim 15, wherein (d) further comprises defining a persistent guest access that provides automatic access to the network by the device, thereby eliminating future notifications when the mobile device is detected on the network.

17. A network configuration, comprising:
a mobile device; and
a wireless home network to communicate with the mobile device, the home network comprising at least one server coupled to at least one access point through a network interface, wherein the server:
(a) detects the presence of the mobile device;
(b) in response to determining that the mobile device is unrecognized, automatically notifies a network administrator and requests authorization from the network administrator to establish a relationship between the network and the mobile device;
(c) in response to receiving the authorization from the network administrator to establish the relationship, requests authorization from a mobile device to establish the relationship; and
(d) establishes the relationship between the mobile device and the network in response to receiving the authorization from the mobile device, such that no additional configuration is required by the mobile device to communicate over the network once the relationship has been established.

18. The network configuration of claim 17, wherein a home relationship is defined between the mobile device and the network.

19. The network configuration of claim 18, wherein the home relationship is established by identifying the network as home in the mobile device, and identifying the device as owned to the server.

20. The network configuration of claim 19, wherein after the home relationship is established, granting the mobile device access to the network and granting the network access to the mobile device.

21. The network configuration of claim 20, wherein the authorization from the network administrator defines a type of relationship the network administrator is willing to grant the mobile device.

22. The network configuration of claim 21, wherein the network administrator is notified by at least one of an audible or visual signal played on one or more devices coupled to the network, or an electronic notification sent to a mobile device owned by the network administrator.

23. The network configuration of claim 22, wherein the server displays on a control center for the network for selection by the network administrator, a list of actions to be taken by the network in regard to the mobile device.

24. The network configuration of claim 23, wherein the list of actions comprises defining a known relationship between the device and the network that continues until revoked, denying access, allowing limited access, or allowing full access.

25. The network configuration of claim 22, wherein the network administrator is allowed to set a default action that defines a home relationship for the device in absence of owner intervention.

26. The network configuration of claim 19, wherein the server stores device identification previously transmitted by the device.

27. The network configuration of claim 19, wherein in response to detecting the presence of the device, the server:
(i) requests the device identification from the mobile device;
(ii) receives the device identification;
(iii) searches for the device identification among stored device identifications; and
(iv) grants the mobile device access to the network based at least in part on not locating the device identification.

28. The network configuration of claim 27, wherein the server stores the device identification previously transmitted by the device.

29. The network configuration of claim 28, wherein the server stores the device identification, and transmits network information to the mobile device to facilitate device recognition of the home network based at least in part on not locating the device identification.

30. The network configuration of claim 28, wherein the server stores a generated device identification generated based at least in part on the device identification being unavailable, and the server transmits to the device the generated device identification and network information to facilitate device recognition of the home network.

31. The network configuration of claim 17, wherein (d) further comprises defining a guest relationship between the mobile device and the network.

32. The network configuration of claim 31, wherein a temporary guest access is defined that allows limited use of the network by the mobile device.

33. The network configuration of claim 32, wherein a persistent guest access is defined that provides automatic access to the network by the device, thereby eliminating future notifications when the mobile device is detected on the network.

34. A non-transitory computer-readable medium for establishing a relationship between a mobile device and a server in a network, the computer readable medium comprising program instructions stored thereon that, when executed by a processing device, cause the processing device to:
(a) detect the presence of the mobile device;
(b) in response to determining that the mobile device is unrecognized, automatically notify a network administrator and request authorization from the network administrator to establish a relationship between the network and the mobile device;
(c) in response to receiving the authorization from the network administrator to establish the relationship, request authorization from the mobile device to establish the relationship; and
(d) establish the relationship between the mobile device and the network in response to receiving the authorization from the mobile device, such that no additional configuration is required by the mobile device to communicate over the network once the relationship has been established.

35. The non-transitory computer-readable medium of claim 34, wherein (d) further comprises defining a home relationship between the mobile device and the network.

36. The non-transitory computer-readable medium of claim 35, wherein (d) further comprises establishing the home relationship by identifying the network as home in the wireless device, and identifying the mobile device as owned to the server.

37. The non-transitory computer-readable medium of claim 36, further comprising upon the establishment of the home relationship, granting the mobile device access to the network and granting the network access to the mobile device.

38. The non-transitory computer-readable medium of claim 37, wherein (c) further comprises defining in the administrator's authorization what type of relationship the administrator is willing to grant the mobile device.

39. The non-transitory computer-readable medium of claim 38, wherein (b) further comprises notifying the network administrator by at least one of an audible or visual signal played on one or more devices coupled to the network, or an electronic notification sent to a mobile device owned by the network administrator.

40. The non-transitory computer-readable medium of claim 39, wherein (b) further comprises displaying on a control center for the network for selection by the network administrator, a list of actions to be taken by the network in regard to the mobile device.

41. The non-transitory computer-readable medium of claim 40, wherein the list of actions comprises defining a known relationship between the device and the network that continues until revoked, denying access, allowing limited access, or allowing full access.

42. The non-transitory computer-readable medium of claim 39, wherein (b) further comprises allowing the network administrator to set a default action that defines a home relationship for the device in absence of intervention.

43. The non-transitory computer-readable medium of claim 36, wherein (a) further comprises:
  (i) requesting, by the sever, the device identification from the mobile device;
  (ii) receiving, by the server, the device identification;
  (iii) searching for the device identification among stored device identifications; and
  (iv) granting the mobile device access to the network based at least in part on locating the device identification.

44. The non-transitory computer-readable medium of claim 43, wherein (d) further comprises storing, by the server, the device identification previously transmitted by the device.

45. The non-transitory computer-readable medium of claim 44, wherein (d) further comprises:
  (i) storing, by the server, the device identification based at least in part on locating the device identification; and
  (ii) transmitting from the server to the device network information to facilitate device recognition of the home network.

46. The non-transitory computer-readable medium of claim 44, wherein (d) further comprises:
  (i) generating a generated device identification for the mobile device based at least in part on not locating the device identification;
  (ii) storing, by the server, the generated device identification; and
  (iii) transmitting from the server to the device the generated device identification and network information to facilitate device recognition of the home network.

47. The non-transitory computer-readable medium of claim 34, wherein (d) further comprises defining a guest relationship between the mobile device and the network.

48. The non-transitory computer-readable medium of claim 35, wherein (d) further comprises defining a temporary guest access that allows limited use of the network by the mobile device.

49. The non-transitory computer-readable medium of claim 36, wherein (d) further comprises defining a persistent guest access that provides automatic access to the network by the device, thereby eliminating future notifications when the mobile device is detected on the network.

* * * * *